United States Patent Office 3,539,604
Patented Nov. 10, 1970

3,539,604
PROCESS FOR SEPARATING SOLID PHASE BY-PRODUCT AMMONIUM HALIDE OR AMINE HYDROHALIDE FROM PARTICULATE ORGANOMETALLIC COMPOUNDS
Howard J. Cohen and John E. Juggins, Baltimore, Md., assignors to SCM Corporation, Cleveland, Ohio, a corporation of New York
No Drawing. Filed May 27, 1968, Ser. No. 732,031
Int. Cl. B01d 11/02; C07f 7/00, 7/28
U.S. Cl. 260—429.5                                            7 Claims

ABSTRACT OF THE DISCLOSURE

This invention sets forth an improved process for separating solid phase byproduct ammonium halide or amine hydrohalide from particulate organometallic compounds. Suitably, the mixture for separation is derived from the reaction of a metal halide, an alkane diol, and ammonia or an amine. Typically, the reactants are titanium tetrachloride, ethylene glycol, and ammonia. The improvement comprises leaching substantially all of the byproducts halide or hydrohalide as a solute in a glycol or triol extract phase while leaving the solid phase product as residue. Preferably, the leaching is performed at a temperature of about 140° C. to 180° C. Byproduct halide or hydrohalide can be precipitated from the extract solution by cooling and the resulting lean solvent can be reused in the leaching process.

---

A standard method for the manufacture of organometallic compounds from the Group IV(b) metals has been to add the halide such as the chloride or bromide of one of these metals to lower alkane diols or triols and to sequester the transitory liberated hydrogen halide with ammonia or an amine. A mixture of byproduct ammonium halide or amine hydrohalide and organometallic product is formed by the reaction.

The byproduct ammonium halide or amine hydrohalide is finely divided and difficult to separate from the organometallic compound when the latter is particulate solid phase material. Anhydrous ammonia and formamide have been proposed for selectively dissolving the ammonium halide or amine hydrohalide for its separation from the organometallic product. This requires costly equipment or employs a costly solvent to carry out the operation. An alternative is to find a selective solvent such as a hydrocarbon, for the organometallic product and leave the byproduct behind as a filter cake. Unfortunately, many of the products are extremely refractory towards dissolution in most solvents and this method has no applicability.

One reference shows reducing the amount of ammonium chloride to be separated by stripping HCl from the reaction mixture with an inert gas prior to the addition of ammonia.

The present invention provides an easy and economical method for separating the solid phase ammonium halide or amine hydrohalide from the particulate solid phase metallic product. More specifically, the advantages of this invention over those disclosed by prior art include the use of low-cost solvent, use of simple low-cost equipment, a way to avoid difficult separations, and practical methods for recovering the solvent.

This invention is based on our discovery that the solubility of ammonium halides and solid phase amine hydrohalides in glycols or in triols increases substantially with an increase in temperature of such solvent. The particulate organometallic product, however, remains relatively insoluble in this hot solvent. Thus, the solid phase byproduct ammonium halide or amine hydrohalide can be substantially selectively leached away.

Broadly, the invention contemplates leaching such byproduct ammonium halide or amine hydrohalide from a water sensitive solid phase organometallic product. The byproduct ammonium halide or amine hydrohalide becomes quite soluble in hot glycol or triol while the particulate organometallic product remains insoluble. The byproduct then is removed in the extract phase while a residue of organometallic product is left. Generally, the organometallic is believed to be fairly extensively polymerized, thus refractory towards dissolution in most common solvents, but it need not be so for utility of our process.

The particulate organometallic products produced by the general reaction, previously described, are water sensitive. By water sensitive, I mean that the organometallic compounds in the presence of water tend to hydrolyze and form condensation polymers. Polymeric organometallic compounds are more stable than the monomeric form, but even such polymeric compounds are not completely water resistant and hydrolyze when exposed to the atmosphere.

Suitable metals are the Group IV(b) metals as shown by the Periodic Chart of the Elements. More specifically, these metals include titanium, zirconium and hafnium. The preferred metal halides for this invention are titanium and zirconium chlorides.

By an organic radical-donating compound, we mean those organic compounds which react with the tetrahalide of the mentioned metals to yield transitory hydrogen halide and a solid phase organometallic product. The transitory hydrogen halide formed is sequestered by ammonia or by an amine, yielding byproduct ammonium halide or amine hydrohalide. Examples of organic radical-donating materials are alkanediols which yield particulate, solid phase organometallic compounds of the Group IV(b) metals.

The alkanediols which can be used as organic radical-donating materials in this process are those described by the general formula:

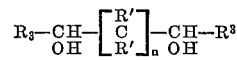

wherein the $R^3$ groups are hydrogen or a group having the structure:

wherein the several $R'$ are hydrogen or an aliphatic hydrocarbon group and $n$ is an integer from 0 to 10, and the resulting organometallic compound yielded is particulate, solid phase substance. Preferably, ethylene glycol or 1–3 butane diol is used as the organic radical-donating compound. The $R'$ groups generally are lower alkyl ($C_1$ to $C_6$ and preferably $C_1$ to $C_4$ for other suitable organic radical-donating diols).

The hydrogen chloride or bromide removing amines can be primary, secondary, or tertiary, providing, however, that their chlorides or bromides coprecipitate with the product in the reaction medium. Suitable amines for this sequestering or removing purpose include butylamine, ethylamine, diethylamine, triethylamine, aniline and other aliphatic and aromatic amines. Others are noted in Nelles, U.S. Pat. 2,187,821.

By a solvent phase of glycol or triol, we mean a solvent phase of a lower alkane ($C_2$ to $C_4$) diol such as ethylene glycol or a propane diol or mixtures thereof and a lower alkane triol ($C_3$ to $C_6$) such as glycerol, 1,2,4-butanetriol and 1,2,6-hexanetriol. Preferably, ethylene glycol is the glycol used as the solvent phase for lixiviating the ammonium chloride or bromide from the solid phase organometallic product. Although the lower alkane diols having more than two carbon atoms, such as the propanediols are useful for the leaching, they are not as suitable for practicing the invention because ammonium chloride or bromide or amine hydrochloride or hydrobromide is not quite as soluble in these diols as in ethylene glycol. Preferably, the lower alkane triol that is used is glycerol. Although butanetriol and hexanetriol are useful, they do not have the dissolving power for ammonium chloride or bromide or amine hydrochloride or hydrobromide that glycerol does.

The preferred method of practicing the invention is to remove the byproduct in a series of passes because smaller and less expensive equipment can be used.

In practicing the invention, we prefer to leach at a temperature of about 140° C. to about 180° C. and at atmospheric pressure for reasons of efficiency and economy. Of course, lower temperatures can be used, but the amount of byproduct chloride or bromide dissolved per unit weight of solvent is considerably less. For example, about 90 grams of ammonium chloride are soluble in one kilogram of solvent glycol at 15° C. whereas 250 grams of ammonium chloride dissolve at 190° C. While we can use much higher temperatures, we prefer to use those which can be accommodated in ordinary atmospheric pressure equipment.

Separation of the hot extract solution from the product residue can be done in conventional ways, e.g. decantation or filtration. The hot extract solution filters easily. The cooling of the hot extract solution to precipitate byproduct chloride or bromide can be regulated to obtain reasonably easily filtered byproduct crystals. The resulting lean solvent can be recycled to the leaching operation or reused in subsequent reactions.

The following examples are included for purposes of illustrating the preferred method for practicing this invention, but are not intended to restrict the scope thereof. All parts are parts by weight and all temperatures are in degrees centigrade unless otherwise specified.

EXAMPLE 1

Ninety-five parts of TiCl$_4$ is mixed at room temperature with 666 parts of ethylene glycol and sufficient ammonia to react with all potential hydrogen chloride from the reaction. The temperature of the mixture reaches 95°. This mixture is heated to 162° while continuing with the addition of ammonia, at which point ammonia is no longer absorbed. A precipitate forms. The mixture is filtered hot and the product is recovered as the filter cake.

The ethylene glycol titanate cake is washed with ethylene glycol, followed by a wash with isopropanol and dried. The product yield is 99% based on the titanium tetrachloride used. The product analysis showed 28.55% titanium, 0.18% chlorine and 0.09% nitrogen. The extract solution was then cooled to 30° to precipitate the ammonium chloride. On filtration, 46 parts of ammonium chloride are obtained as the cake and 61 parts remain in the solution.

EXAMPLE 2

The reaction of 43 parts of titanium tetrachloride with 490 parts of 1,3-butanediol and 43 parts of ammonia yield 1,3-butanediol titanate and ammonium chloride as a coprecipitate. This coprecipitate is is isolated by filtration, then washed with hot (somewhat above 100°) 1,3-butanediol and isopropanol.

A portion of the coprecipitate is removed and heated to about 130° in an agitated vessel containing ethylene glycol. After filtering the hot mixture, the filter cake is washed with isopropanol and dried, yielding 1,3-butanediol titanate product. The product analysis shows the following: titanium—21.67%; carbon—42.72%; hydrogen—7.16%; nitrogen—0.08%; chlorine—0%. Product yield was 77% based on titanium tetrachloride used.

A lie leaching operation can be performed with glycerol used in place of the glycol to give substantially the same results.

EXAMPLE 3

In Example 2, if the titanium tetrachloride is replaced by 53 parts of zirconium tetarchloride; 1,3-butanediol zirconate is obtained as product.

What is claimed is:

1. In a process for the preparation of a water sensitive solid phase organometallic product wherein a Group IV($b$) metal tetrahalide selected from the group consisting of tetrachlorides and tetrabromides is reacted directly in a reaction zone with an alkane diol in the presence of ammonia or an amine to yield a mixture of said product and solid phase byproduct ammonium halide or amine hydrohalide from transitory liberated hydrogen halide, the improvement which comprises leaching said mixture with a solvent phase of glycol, triol, or a mixture thereof until substantially all of said solid phase byproduct is dissolved and removed to leave a residue of product.

2. The process of claim 1 wherein said leaching is performed in a plurality of stages.

3. The process of claim 1 wherein said leaching is performed at a temperature $T_1$, the resulting extract solution is cooled to a temperature $T_2$, which is substantially below $T_1$ whereby solid byproduct precipitates from said extract solution and leaves the extract solution a lean solution, and said lean solution is recycled to the leaching operation.

4. The process of claim 1 wherein the alkane diol is a lower alkane diol.

5. The process of claim 4 wherein said diol is 1,3-butanediol.

6. The process of claim 4 wherein the diol is ethylene glycol, and it is used substantially in excess of that necessary to form the product, said excess being used as leaching solvent.

7. The process of claim 6 wherein the tetrahalide is titanium tetrachloride.

References Cited

UNITED STATES PATENTS

| | | | |
|---|---|---|---|
| 2,654,770 | 10/1953 | Herman | 260—429.5 |
| 2,655,523 | 10/1953 | Herman | 260—429.5 |
| 3,119,852 | 1/1964 | Gilsdorf | 260—429.5 |

TOBIAS E. LEVOW, Primary Examiner

H. M. S. SNEED, Assistant Examiner

U.S. Cl. X.R.

23—309, 312; 260—429.3